April 21, 1970     L. G. RUSSELL     3,507,320
APPARATUS HEATING A STRUCTURE USING THE LIGHTING LOAD
Filed Jan. 28, 1969     2 Sheets-Sheet 1

INVENTOR
Lisle G. Russell
BY W. D. Palmer
ATTORNEY

United States Patent Office 3,507,320
Patented Apr. 21, 1970

3,507,320
APPARATUS HEATING A STRUCTURE USING THE LIGHTING LOAD
Lisle G. Russell, Pittsburgh, Pa., assignor to Westinghouse Electric Corporation, Pittsburgh, Pa., a corporation of Pennsylvania
Filed Jan. 28, 1969, Ser. No. 794,484
Int. Cl. F24f *3/00, 13/04*
U.S. Cl. 165—26                                            8 Claims

ABSTRACT OF THE DISCLOSURE

Apparatus for effectively and economically lighting and heating and cooling a structure. Artificial light sources are used to illuminate the interior of the structure and are cooled by adjacent panel means connected to a first fluid filled, closed system, with the absorbed heat being transferred from the first closed system to a second fluid filled, closed system. A heat pump removes the heat from the second closed system and also from an air cooling heat exchanger, and the removed heat is transferred by the heat pump to a third fluid filled, closed system, which in turn heats an air heating heat exchanger. A double duct air handling system has one duct portion heated by the air heating heat exchanger, and the other duct portion thereof is cooled by the air cooling heat exchanger. The two ducts are connected to the inlet of an air mixing box which in turn is controlled by a thermostat means, located within the structure, to regulate the relative amounts of warm air and cold air which are mixed, prior to introduction into the structure, in accordance with the measured temperature therein.

BACKGROUND OF THE INVENTION

This invention relates to an apparatus for effectively and economically air heating and cooling an enclosed structure, such as a building with the heating accomplished by the energy which is supplied to light the building.

Heating a building primarily by the unused heat which is emanated by the artificial light sources is well known and was described to some degree in an article entitled "Design Factors in Panel and Air Cooling Systems" which appeared in "Heating, Piping and Air Conditioning," May 1951, page 115. In one embodiment of such a system, the lighting fixtures are recessed and are water cooled, and the heat absorbed at the lighting fixtures is transferred to a liquid-cooled perimeter panel positioned beneath the windows, in order to replace the heat which is lost through the windows. The use of such water cooled luminaires is also effective during the summer months to remove the absorbed heat generated by the artificial light sources before such heat is transferred to the air conditioned space therebelow, thereby reducing the cooling required within the structure and reducing the size of the air conditioning system which otherwise would be required, and such a system is disclosed in U.S. Patent No. 3,090,434, dated May 21, 1963.

In all of the foregoing systems, the primary problem which is presented is the redistribution of heat, in order to utilize effectively practically all of the heat which might otherwise be wasted. Particularly where a large building structure is involved, even in the colder months the system will normally be required to move heat out of the interior area. During the winter months, such heat will be moved to the building perimeter to make up the heat lost through the windows and walls. During the summer months, heat which is generated within the building is normally effectively dissipated in order to facilitate air conditioning of same.

It is the general object of the present invention to provide an apparatus for effectively and economically lighting and heating and cooling an enclosed structure such as a building.

It is another object to provide an apparatus wherein excess heat generated by the artificial light source, which heat is over and above that required to maintain the heating of the building, is readily stored for later use when the light sources are not energized.

It is an additional object to provide a combination all-air conditioning apparatus which incororates water-cooled lighting fixtures, which apparatus can readily be adapted to store the excess heat which is over and above that required for normal heating.

The foregoing objects of the invention, and other objects which will become apparent as the description proceeds, are achieved by providing an apparatus which comprises artificial light source means which are operatively associated with the space to be conditioned, in order to illuminate same at a predetermined high brightness level. The artificial light sources are each liquid cooled by an adjacent panel which intercepts a substantial portion of the heat which is generated by the artificial light sources. A first closed, heat moving, fluid circulating system is operative to move the heat absorbed by the panels adjacent the light sources to the high temperature side of a first heat exchange means. A conventional heat pump, which operates to pump heat from a low temperature side thereof to a high temperature side thereof, is connected to a second closed, heat moving, fluid circulating system. This second closed system is connected to the low temperature side of the heat pump, and to an air cooling heat exchange system, and also to the low temperature side of the first heat exchange means, in order to move heat from both the air cooling heat exchange system and the lw temperature side of the first heat exchange means to the low temperature side of the heat pump. There is also provided a third closed, heat moving, fluid circulating system which is connected to an air heating heat exchange system and to the high temperature side of the heat pump, in order to move heat from the heat pump to the air heating heat exchange means. The air distribution is provided by a double duct air ciculating system. One of the double ducts constitutes a cool air duct and is in heat transfer relationship with the aforementioned air cooling heat exchange system in order to cool air which is passing therethrough to a predetermined temperature which is sufficiently low to effect cooled air conditioning of the enclosed space. The other of the double ducts constitutes a hot air duct and is in heat transfer relationship with the air heating heat exchange system in order to heat air passing therethrough to a predetermined temperature which is sufficiently high to effect heated air conditioning of the enclosed space. An air mixing box has the cool air duct and the hot air duct both connected to the inlet portion thereof. The mixing box is controlled by a thermostat which is positioned in the enclosed space which is being air conditioned and controls the mixing ratio of hot air and cold air in the mixing box in accordance with the difference between the measured and the desired temperature in the closed space which is being air conditioned. A mixed air supply duct connects to the outlet side of the mixing box and terminates in an air inlet which opens into the enclosed space being air conditioned.

BRIEF DESCRIPTION OF THE DRAWINGS

For a better understanding of the present invention, reference should be made to the accompanying drawings, wherein.

DESCRIPTION OF THE PREFERRED EMBODIMENT

While the present apparatus can be utilized to effectively and economically light and heat and cool any enclosed structure, it has been particularly designed for lighting and heating and cooling a twenty-three story building which will be specifically described. The basic structure of the building is a steel frame with curtain walls of aluminum and glass. In the center core of the building are the elevators and other services, and surrounding the center core is an interior open area in which the supporting personnel and others work. Around the perimeter of the building are the executive offices.

From an environmental control point of view, the foregoing conventional floor plan requires that in summer, fall, winter and spring that heat must be moved. For example, except in the most extreme below-zero cold, the interior area always has too much heat. The perimeter offices, on the other hand, present a definite seasonal problem in that during the winter, they lose heat through the walls and windows and in summer, they build up too much heat, even though the building is provided with insulated curtain walls and double glazed windows of heat-absorbing glass.

A building as described has many built-in sources of heat and the largest constant source of heat is the lighting system. In accordance with present standards of lighting levels, the executive perimeter offices will enjoy a minimum artificial lighting level of 150 foot candles and the open interior areas will often average from 200 to 225 foot candles. Such a level of lighting can constitute a bonus or a liability in heat, depending on how it is used. For example, approximately 20% of the electrical energy that flows into present-day fluorescent lamps emerges as useful light energy, and even that eventually converts to heat energy; the other 80% is converted directly to heat. People are also heat sources, as are many types of office machines in the clerical work areas.

With the building such as described hereinbefore, all of the heat sources add up to enough heat to take care of all of the building's heating needs about 95% of the occupied time. With such a building design, what is required is a way to efficiently move heat from the "wrong" places to the "right" places and excess heat should be taken from the interior of the building and moved to the perimeter offices during the winter, or into a storage system where some of it can be saved to heat the building at night and on week-ends. During the summer months, it is also necessary to remove the heat from the building and efficiently dispose of it so that the load on the air-conditioning is minimized.

Figure 1:
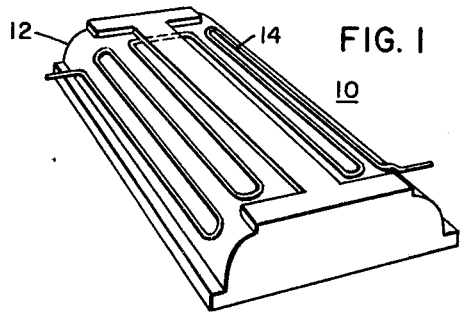
FIGURE 1 is an isometric view of a water-cooled fluorescent lighting troffer which constitutes an essential part of the present apparatus.

In FIG. 1 is shown a water-cooled fluorescent lighting fixture which is particularly adapted for use as a component of the present apparatus. Briefly, the fixture 10 comprises a troffer 12 formed of bonded-steel sheets which have a high rate of heat transfer. The troffer 12 has channels 14 provided therein which are adapted to have cooling water flowing therethrough. When such a fixture is adapted to contain six 40 watt fluorescent lamps, it has been found that a minimum of 70% of the input electrical energy from the lighting system is picked up as heat by water, initially at 70° F., circulating at a rate of 0.8 to 0.9 gallon per minute through the network. In the preferred construction, five fixtures are connected in series and water enters the initial fixtures at a temperature of 70° F. and leaves the fifth fixture at a temperature of approximately 79° F. The water cooling has the additional advantage in that the desired lighting levels are achieved by operating the fluorescent lamps at a lower temperature than they would be in uncooled fixtures, thereby increasing the lumen output of each fixture by about 10 to 12%. For the foregoing lighting levels, approximately 7.1 watts per square foot of lighting energy is fed into the lighting system, but only 2.1 watts enters into the area being illuminated as heat.

Figure 2:
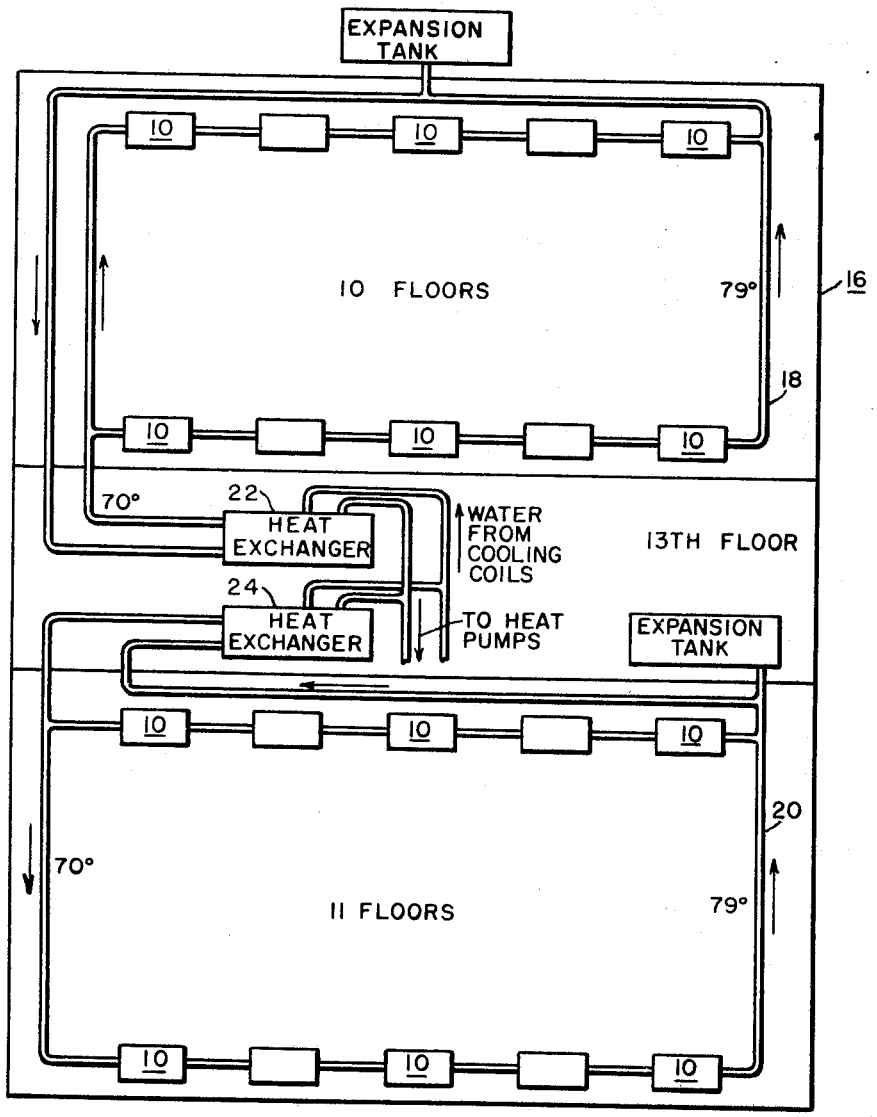
FIG. 2 is a diagrammatic elevation of a building which is illuminated and heated and cooled by an apparatus constructed in accordance with the present invention.

In the preferred form of the present apparatus, for environmental conditioning a twenty-three story building 16, the heat removal system for the lighting is divided into two closed-loop water circulating systems 18 and 20, as shown in FIG. 2. The water in the upper loop 18 is circulated up ten floors through about 400 light fixtures per floor and returned to the high temperature side of a heat exchanger 22 on the thirteenth floor, carrying with it about 9° F. of heat from the light fixtures. The water in the lower loop 20 is circulated down eleven floors through about the same number of fixtures per floor and is carried back to the high temperature side of a second heat exchanger 24 located on the thirteenth floor. The heat exchangers remove the heat introduced by the lighting system and send the water back toward the light fixtures at its original 70° F.

Figure 3:
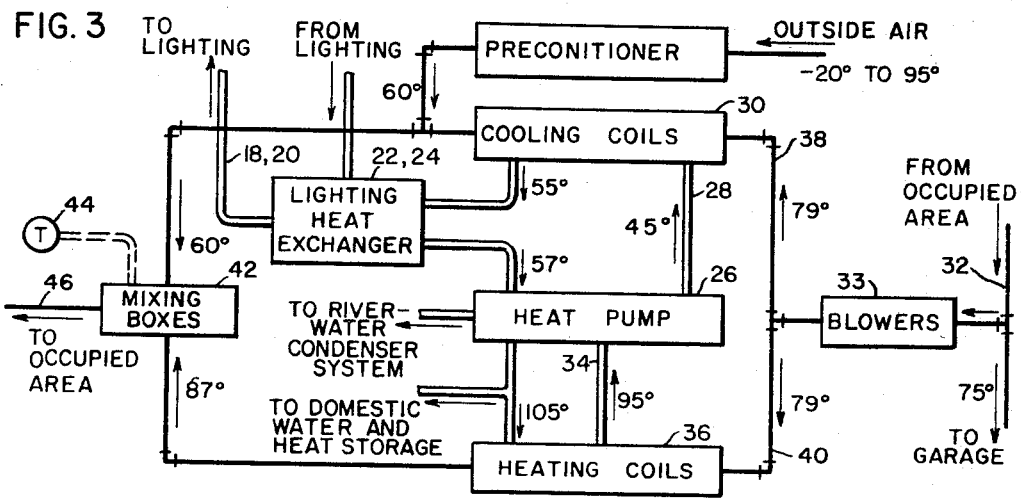
FIG. 3 is a diagrammatic view showing the basic components of the present apparatus.

The general system is shown schematically in FIG. 3. The water cooled fluorescent troffers 12, together with the heat exchangers and the connecting pipes, form a first closed, heat moving, fluid circulating system for circulating cooling fluid through the fluorescent troffers to absorb intercepted heat therefrom and then to flow through the high temperature side of the heat exchange means 22 and 24, as shown in FIGS. 2 and 3.

In the basement of the building are located heat pumps which are operable to pump heat from a low temperature side to a high temperature side thereof. As shown in FIG. 3, the low temperature side of the heat pump 26 is in heat exchange relationship with a second closed, heat moving, fluid circulating system 28 which is also connected to an air-cooling heat exchange system 30, and to the low temperature side of the lighting heat exchanger 22, 24, in order to move heat from the air cooling heat exchanger system 30 and the low temperature side of the lighting heat exchanger means 22, 24 to the low temperature side of the heat pump 26. By this arrangement, the heat from the fluorescent fixtures 10 has now been transferred to the second closed system 28 which operates at a lower temperature. As a specific example, the chilled water enters the cooling coils of the air-cooling heat exchanger 30 at 45° F. and then enters the lighting system heat exchange means 22, 24 at approximately 55° F. after the lighting heat has been added to it, the water leaves at approximately 57° F. and returns to the low temperature side of the heat pump means. The chilled water, having removed much of the excess heat from the wrong places, must now transfer heat to the right places.

In the specific building described herein, the transfer process begins by taking the heat away from the thirteenth floor mechanical room, by way of the closed-loop chilling water circulating system 28 to heat pumps which are located in the basement mechanical room of the building 16. These heat pumps 26 are conventional and essentially comprise a device that raises the energy level of the heat being supplied and moves heat from one place to another, in order to meet the needs of the building. The heat is moved downstairs into the basement in the chilled water system 28 at approximately 57° F. enters the heat pumps 26 and is extracted from the water; it is now available for reassignment. Depending upon the time of the year, that is, winter or summer, the heat can be dumped or disposed of or sent back into the building to locations where it is needed.

Of course the lights do not constitute the only source of heat, and in addition to the heat from the lighting fixtures 10, there is also the heat from people and machines, from the uncaptured radiant heat the light fixtures give off, and in summer, from the sun and outside air. This excess heat is picked up by an air distribution system, which supplies air to (and draws air out of) both the interior areas and the perimeter areas, and the air distribution system is shown in FIG. 3. As the air distribution system draws air out of the enclosed area which is being conditioned, it takes heat along with it. The heat laden air is carried through return ducts 32 to the thirteenth floor where the main air-handling systems are located. At the blowers 33, which raise the temperature of the air approximately 4° F. to 79° F., a small proportion of the circulated air is bled off and this is replaced downstream from the cooling coils with fresh air. The bled-off stale air can be used to help heat underground parking facilities to warm same in the winter and cool in the summer.

In the specific building described, the air in the building is completely changed at least eight times an hour, and some locations will enjoy a rate of change fourteen times an hour. The rapid rate of air turn-over eliminates smoke and other fumes that often linger. The present system is particularly useful in that there is no "change-over" from winter to summer or summer to winter, since the air-handling system provides both heating and cooling capability every hour of the day, as described hereinafter. The heat pumps 26 in the basement constitute a part of a third closed, heat moving, fluid circulating system 34 which is connected to an air-heating heat exchange system 36, located on the thirteenth floor, and to the high temperature side of the heat pump 26, in order to move heat from the heat pump 26 to the air heating heat exchanger 36. As a specific example, water is pumped in the third closed system 34 from the heat pump 26 to the air heating heat exchanger 36 at a temperature of 105° F. where it loses 10° F. of its heat.

As shown in FIG. 3, air leaving the blowers 33 proceeds through a double duct system at a temperature of approximately 79° F. One of the double ducts 38 constitutes a cool air duct and is in heat transfer relationship with the air cooling heat exchanger 30 in order to cool air passing therethrough to a predetermined temperature which is sufficiently low to effect cooled air conditioning of the building. Typically, the air leaving the cooling coils is at about a temperature of 60° F. The other of the double ducts 40 constitutes a hot air duct and is in heat transfer relationship with the air heating coils 36 in order to heat air passing therethrough to a predetermined temperature which is sufficiently high to effect heated air conditioning of the space involved. A typical temperature for the air leaving the heating coils is 78° F. The double ducts circulate from the thirteenth floor to individual air mixing boxes 42 which are located throughout the building. In the specific building described, there are approximately twenty-two air mixing boxes for each floor and each individual mixing box is controlled by thermostat 44 which is located in the relatively small room or area module which is being controlled with respect to temperature. Typically, the thermostats can be associated with the light fixtures 10 which can be readily adapted to handle the return air, and such an arrangement is conventional in the field of lighting. If the thermostat senses that the area involved needs more heat, it operates the mixing box 42 involved so that more air is drawn in through the hot-air half of the double duct system. Conversely, if cooling is needed, the thermostat controls the mixing box to draw in relatively more cool air, and such thermostat controls and associated mixing boxes are generally known in the field of air conditioning. In the general schematic representation as shown in FIG. 3, a mixed air supply duct 46 connects to the outlet side of the mixing box 42 and terminates in an air inlet which opens into the individual room or area module which is controlled by the thermostat 44.

One of the main advantages of the foregoing system is that each relatively small room area or module is individually controlled by its own thermostat and mixing box which has supplied thereto the cool air and warm air, with all of the heat normally supplied by that composite heat which is removed from the lighting fixtures. Thus the system is extremely flexible and during winter months, the heat is readily transferred from the interior work areas to the perimeter offices.

Figure 4:
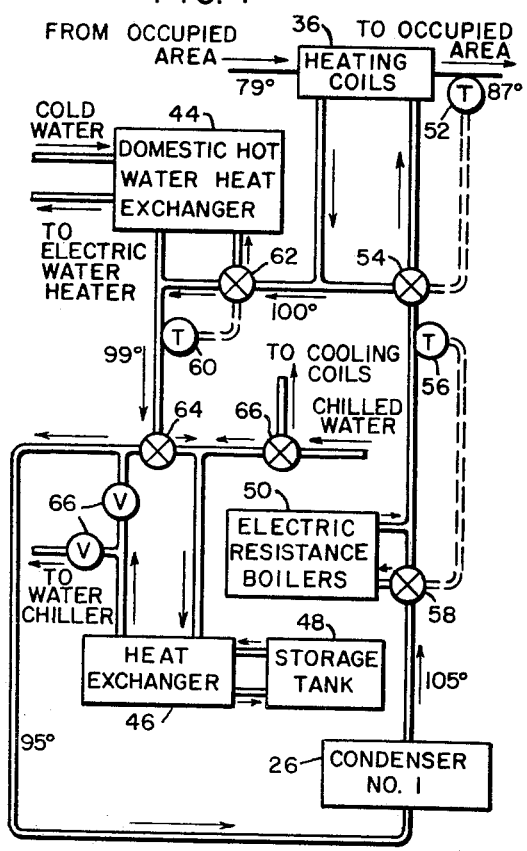
FIG. 4 is a view similar to FIG. 3 but is more detailed with respect to setting forth the heating cycle of the present apparatus.

The present system is readily adapted to provide other facilities, and a more detailed schematic showing of the heating side of the present apparatus is shown in FIG. 4. For example, water leaves the high temperature side of the heat pump 26 at approximately 105° F. and returns to the heat pump at approximately 95° F. Under most conditions of operation, more heat will be available than is required to heat the air in the heat exchanger 36. Accordingly, and as shown in FIG. 4, water passing from the heat exchanger 36 can be used to preheat domestic water by passing it through an additional heat exchanger 44 and the still-hot water can be passed through a second heat exchanger 46, which in the specific building described is used to heat to 90° F. a 150,000 gallon storage tank 48 which is located below the basement of the building. The water in this storage tank 48 will contain enough heat to maintain the building warm through a two-day week-end. To take care of that occasional third day, or when the temperatures dip well below zero, there is also provided an auxiliary heating system comprising electrical resistance boilers 50 which can be used to maintain the temperature in the hot water line above a predetermined minimum.

Other refinements of the system include a thermostat 52 which cotrols a three-way valve 54 so that the water temperature leaving the heat exchanger 36 is maintained at about 87° F. Water leaving the high tempearture side of the heat exchanger 26 (shown as a condenser) is monitored by a thermostat 56 which actuates the valve 58 and the electric resistance boilers 50. A thermostat 60 monitors the temperature of the water leaving the domestic hot water heater 44 to control the flow of water thereto by means of the valve 62. The valve 64 serves to direct hot water into the heat exchanger 46 when excess heat is required to be stored. The hot water closed system 34 can be interconnected with the cold water system 28 by valves 66 to introduce heated water from the storage tank 48 into the chilled water system to provide heat for the building at night and on week-ends.

Figure 5:
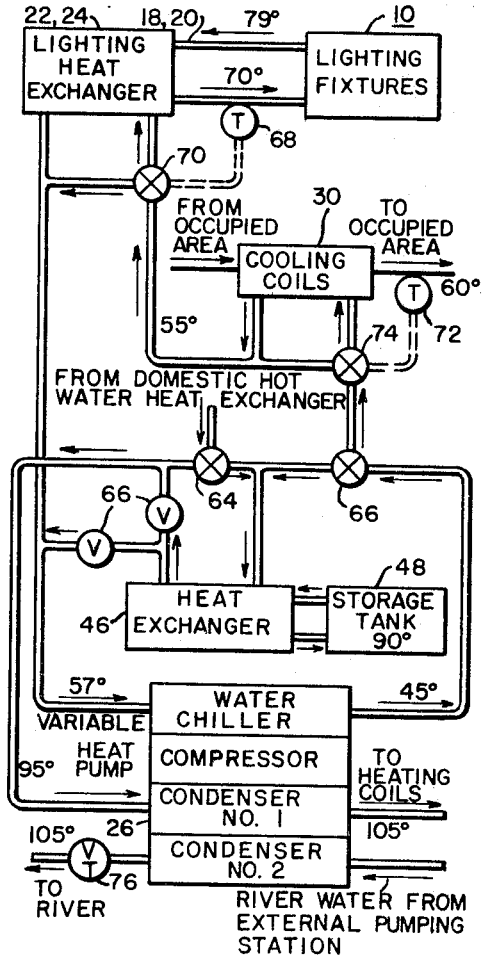
FIG. 5 is a view similar to FIG. 3 but illustrates in more detail the cooling cycle of the present apparatus.

The cold water or cooling system is shown in more detail in the schematic showing of FIG. 5. For the specific building as described, excess heat from the high temperature side of the heat pump 26 is disposed of by transferring same to river water through valve 76 during the summer months, using a double condenser system. This heat could be readily disposed of with a conventional spray cooler if river water were not available. Other refinements of the cooling water closed system include a thermostat 68 which senses the temperature of the water introduced into the fixtures 10 to control a three-way valve 70 and thus the flow of water to the heat exchanger means 22, 24. A thermostat 72 senses the temperature of the air leaving the heat exchanger 30 to control the valve 74 and thus the flow of cool water to the heat exchanger 30.

The foregoing system is most economical since the only energy expended during a normal heating week-end is that energy which is used to operate the fans, chillers and circulating pumps. By storing the heat energy that was already available in the building, the yearly operating saving for such a building is quite substantial. The system is extremely flexible in that no particular conversion is needed from summer to winter changeover. In addition, the use of the water cooled lighting fixtures with the air handling system minimizes the amount of air which has to be circulated since a substantial portion of the heat generated within the building is removed before it enters into the space being conditioned. This in turn reduces the size of the duct work and for a building as of the size described, the height of this building is reduced by approximately thirty-seven feet. In addition, since much of the heat is removed from the building before it ever enters into the space to be air conditioned, the amount of air conditioning equipment required is substantially curtailed.

The foregoing system is quite efficient in that the cooling water which is circulated to the fluorescent troffers is at about, or slightly below the desired room temperature. In this manner, heat loss from the connecting pipes is minimized and heat transfer is most effective. The water in the second fluid circulating system, however, is at a temperature substantially below the desired room temperature and the water in the third closed circulating system is at a temperature which is substantially above the desired room temperature. The amount of piping which is involved in these second and third closed systems is, however, relatively limited so that adequate insulation is a simple matter.

As shown in FIG. 3, make-up air is preconditioned, and humidified or dehumidified as required, to a temperature of approximately 60° F. and is introduced into the cool air duct 38 on the down side of the cooling coils 30.

The present system is particularly adapted to the use of air handling troffers wherein air is introduced into the enclosed space around the sides of the individual troffers, except at the perimeter areas where vertically disposed windows represent areas of heat loss or gain, depending upon the season. In such case, the air inlets for these perimeter areas are positioned at least in part beneath the windows where the warm or cold air can form a curtain or screen.

Various modifications of the present apparatus are contemplated. For example, in the specific building which has been described, there have been provided four double-duct air-supply systems, each of which serves a quadrant of the building. Each of these double duct systems supplies a substantial number of mixing boxes, with one mixing box being provided for each room or area which is separately controlled with respect to temperature.

It should be understood that the water which is utilized in the closed system is treated to prevent corrosion and freezing. Other fluids could be used to replace the water, particularly in the first closed system, an example being diethylene glycol.

It will be recognized that the objects of the invention have been achieved by providing an all-electric building heating system which is extremely economical and flexible and wherein heat is readily transferred from areas where it is not needed to areas where it is needed and can also be stored. The system is particularly adapted for efficiency of operation and no particular conversion is needed to change from winter to summer operation and vice versa.

While a preferred embodiment of the invention has been illustrated and described in detail, it is to be particularly understood that the invention is not limited thereto or thereby.

What is claimed is:

1. An apparatus for effectively and economically lighting and heating and cooling an enclosed space, said apparatus comprising:
   (a) artificial light source means operatively associated with said space for illuminating same at a predetermined high brightness level, and a liquid cooled panel means associated with said light source means for intercepting a substantial portion of the heat generated by said artificial light source means;
   (b) a first closed, heat moving, fluid circulating system for circulating a cooling fluid through said liquid cooled panel means to absorb intercepted heat therefrom and then to flow through the high-temperature side of a first heat exchange means to transfer absorbed heat thereto;
   (c) a heat pump means operable to pump heat from a low temperature side thereof to a high temperature side thereof;
   (d) a second closed, heat moving, fluid circulating system connected to said low temperature side of said heat pump means, to an air-cooling heat exchange system, and to the low-temperature side of said first heat-exchange means to move heat from said air-cooling heat exchange system and said low-temperature side of said first heat-exchange means to said low temperature side of said heat pump means;
   (e) a third closed, heat moving, fluid circulating system connected to an air heating heat exchange system and to said high temperature side of said heat pump means to move heat from said heat pump means to said air heating heat exchange means;
   (f) a double duct air circulating system, one of said double ducts constituting a cool air duct and being in heat transfer relationship with said air cooling heat exchange system to cool air passing therethrough to a predetermined temperature which is sufficiently low to effect cooled air conditioning of said enclosed space, the other of said double ducts constituting a hot air duct and being in heat transfer relationship with said air heating heat exchange system to heat air passing therethrough to a predetermined temperature which is sufficiently high to effect heated air conditioning of said enclosed space; and
   (g) an air mixing box means having said cool air duct and said hot air duct both connected to the inlet portion thereof, a thermostat means in said enclosed space and connecting to said mixing box means for controlling the mixing ratio of hot air and cold air in said mixing box means in accordance with the difference between the measured and desired temperature in said closed space, and a mixed air supply duct connecting to the outlet side of said mixing box means and terminating in air inlet means opening inso said enclosed space.

2. The apparatus as specified in claim 1, wherein cooling liquid is circulated to said liquid cooling panel means at about or slightly below desired room temperature, fluid in said second fluid circulating system is at a temperature substantially below desired room temperature, and fluid in said third fluid circulating system is at a temperature substantially above desired room temperature.

3. The apparatus as specified in claim 2, wherein excess heat developed in said third fluid circulating system when said artificial light source means are operating is transferred, via an additional heat exchange means, to a large capacity fluid storage tank for ultimately supplying heat via said heat pump means to said third fluid circulating system when said artificial light source means are not operating for maintaining said enclosed space in a heated condition.

4. The apparatus as specified in claim 3, wherein supplemental heating means are used to maintain the temperature in said third fluid circulating system at said temperature substantially above desired room temperature when said artificial light source means are deactivated for a prolonged period of time.

5. The apparatus as specified in claim 1, wherein the substantial amount of air passed through said double duct system is exhausted from said enclosed space and thence into said double duct system, make up air is preconditioned by conditioning means to approximately the temperature of air passing into said mixing box from said cooling duct, and said make-up air is introduced into said cooling duct.

6. The apparatus as specified in claim 1, wherein said enclosed space includes vertically disposed windows which represent areas of heat loss or gain, and said air inlet means are positioned at least in part beneath said windows.

7. The apparatus as specified in claim 1, wherein during periods of relatively high external temperatures, excess heat developed at said heating-condenser side of said heat pump means is disposed of via a heat-dissipating heat exchange means.

8. The apparatus as specified in claim 1, wherein a plurality of said enclosed spaces are served by said double duct air circulating system, and each of said enclosed spaces has associated therewith one of said air mixing box means and said thermostat means.

References Cited
UNITED STATES PATENTS

| | | | |
|---|---|---|---|
| 2,755,072 | 7/1956 | Kreuttner | 165—22 X |
| 2,819,023 | 1/1958 | Marshall | 263—13 |
| 3,090,434 | 5/1963 | Benson et al. | 98—40 X |
| 3,401,742 | 9/1968 | Meckler | 98—40 X |

ROBERT A. O'LEARY, Primary Examiner

A. W. DAVIS, JR., Assistant Examiner

U.S. Cl. X.R.

98—40; 165—22, 29, 50, 107; 236—13